(12) United States Patent
Sherif et al.

(10) Patent No.: US 8,401,331 B2
(45) Date of Patent: Mar. 19, 2013

(54) VIDEO QUALITY ANALYSIS USING A LINEAR APPROXIMATION TECHNIQUE

(75) Inventors: Mahmoud Ragaei Sherif, Landing, NJ (US); Ahmed A. Tarraf, Bayonne, NJ (US); Xin Wang, Parsippany, NJ (US); Jian Yi, Bridgewater, NJ (US); Mohammad Hossein Zarrabizadeh, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1475 days.

(21) Appl. No.: 11/951,367

(22) Filed: Dec. 6, 2007

(65) Prior Publication Data

US 2009/0147143 A1 Jun. 11, 2009

(51) Int. Cl.
*G06K 9/64* (2006.01)
(52) U.S. Cl. ......................................... 382/278; 382/100
(58) Field of Classification Search .................. 345/960; 375/326; 380/205; 382/100, 266; 386/112; 704/202, 237, 241; 714/756; 725/112
See application file for complete search history.

(56) References Cited

U.S. PATENT DOCUMENTS

| | | | | |
|---|---|---|---|---|
| 4,092,493 A * | 5/1978 | Rabiner et al. | ................. | 704/237 |
| 4,799,262 A * | 1/1989 | Feldman et al. | ............. | 704/241 |
| 5,428,774 A * | 6/1995 | Takahashi et al. | ............. | 345/960 |
| 6,785,401 B2 * | 8/2004 | Walker et al. | ................. | 382/100 |
| 7,130,443 B1 * | 10/2006 | Werner et al. | ................. | 382/100 |
| 2006/0111897 A1 * | 5/2006 | Gemello et al. | ............. | 704/202 |
| 2006/0227968 A1 * | 10/2006 | Chen et al. | ................... | 380/205 |
| 2007/0248331 A1 * | 10/2007 | Hamada et al. | ................. | 386/112 |
| 2008/0247663 A1 * | 10/2008 | Jacobsen | ...................... | 382/266 |
| 2009/0193484 A1 * | 7/2009 | Zhang et al. | .................. | 725/112 |
| 2011/0075766 A1 * | 3/2011 | Kim et al. | ..................... | 375/326 |
| 2011/0083056 A1 * | 4/2011 | Choi et al. | .................... | 714/756 |
| 2011/0261996 A1 * | 10/2011 | Keidar et al. | ................. | 382/100 |

* cited by examiner

*Primary Examiner* — Vu Le
*Assistant Examiner* — Xuemei Chen
(74) *Attorney, Agent, or Firm* — Carlson, Gaskey & Olds PC

(57) ABSTRACT

A video analysis technique includes correlating frames from a processed video with frames from a pre-processed, original video. A linear approximation of a relationship between the correlated frames is determined. A disclosed example includes determining a linear approximation that maximizes the number of processed video frames that fit into the linear approximation. The linear approximation and whether any frames do not fit within the linear approximation is then used to provide quality information for analyzing a quality of the processed video.

20 Claims, 3 Drawing Sheets

VIDEO QUALITY ANALYSIS USING A LINEAR APPROXIMATION TECHNIQUE

BACKGROUND

This invention generally relates to video processing. More particularly, this invention relates to video quality analysis.

There are various situations and circumstances in which video information is processed for a specific purpose. For example, a video file may be transmitted from one device to another over a line-based or wireless link, for example. Transmitting a video often involves compressing the content of the video file so that it can be transmitted. The receiving device will then decompress the video file so that the original content can become available to a user of the receiving device.

One difficulty associated with such processing of a video file is that a compression algorithm may cause some errors in the eventually decompressed file or may introduce some inconsistencies between the original and processed video files. Additionally, the transmitting technique may introduce errors. For example, the available bandwidth over a wireless link or the signaling conditions over a transmitting medium can introduce errors.

It would be useful to be able to determine whether video processing is providing reliable results such that a processed video corresponds within a selected guideline to the original video. This invention provides a technique for determining a quality of a processed video.

SUMMARY

An exemplary method of analyzing a processed video includes correlating each frame of the processed video to a corresponding frame of a pre-processed version of the video. A linear approximation of a relationship between the correlated frames allows for determining a quality of the processed video based upon whether any of the frames does not fit within the linear approximation.

An example device for analyzing a processed video includes a correlation portion that correlates each frame of the processed video to a corresponding frame of a pre-processed version of the video. A linear approximately portion determines a linear approximation of a relationship between the correlated frames. A quality determination portion utilizes information regarding any frame that does not fit within the linear approximation to provide an indication of the quality of the processed video.

The various features and advantages of this invention will become apparent to those skilled in the art from the following detailed description. The drawings that accompany the detailed description can be briefly described as follows.

DETAILED DESCRIPTION

Figure 1:
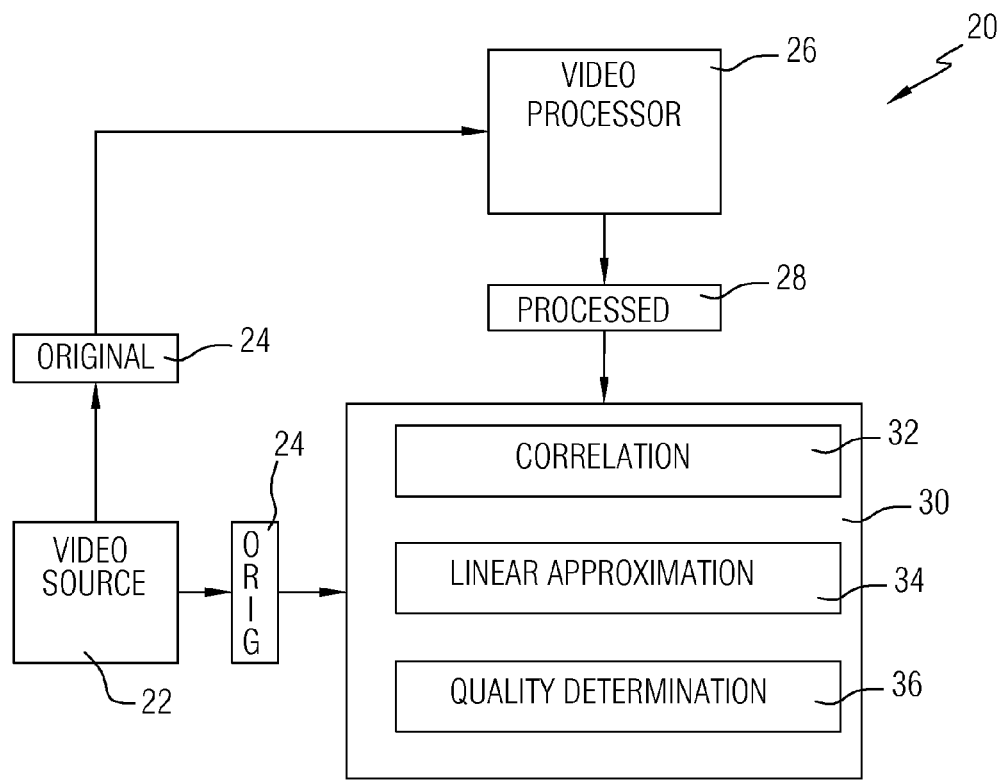
FIG. 1 schematically illustrates selected portions of an example arrangement for analyzing a quality of a processed video.

FIG. 1 schematically illustrates an arrangement 20 for analyzing a quality of a processed video. A first device 22 is regarded as a video source that provides an original version of a video schematically shown at 24. The term "original" version of a video as used in this description does not necessarily mean that the device 22 generated the original file of the video. "Original" and "pre-processed" are used in this description for describing a video file before it is processed by a device of interest. That version of the video file may be an original or may have undergone some processing before reaching its current state. The reference to "original" or "pre-processed" versions of a video is used to indicate the version of a video file that is compared to a processed version of the video file for determining whether the processing resulting in the processed video file has altered the contents of the file in any way that impacts the quality of the video file.

In the example of FIG. 1, a second device 26 is referred to as a video processor because it provides a processed version of the video file schematically shown at 28. A variety of processing techniques may be used depending on the particular device 26 in a given situation. In one example, the video source 22 is a mobile station that transmits the original video file 24 over a wireless link. In that example, the second device 26 is a mobile station that receives the transmitted video file. In one such example, the compression, transmission, reception, decompression, or a combination of more than one those comprises the processing of interest that results in the processed video file 28.

Given this description, those skilled in the art will realize whether other example video processing situations would benefit from a video quality analysis consistent with this invention.

FIG. 1 includes a quality analysis device 30 that determines whether the processed video 28 is of a sufficient quality to meet a desired correspondence to the original video 24. In one example, the quality analysis device 30 comprises a computer configured to perform the correlation, linear approximation and quality analysis techniques of this description. In one example, software for using a screen capturing technique for analyzing the processed video is used by the computer.

The example device 30 includes a correlation portion 32 that correlates the frames of the original video 24 and the processed video 28. A linear approximation portion 44 determines a linear approximation of a relationship between the correlated frames. A quality determination portion 36 uses the linear approximation and information regarding whether any frame does not fit within the linear approximation for making a quality determination.

Figure 2:
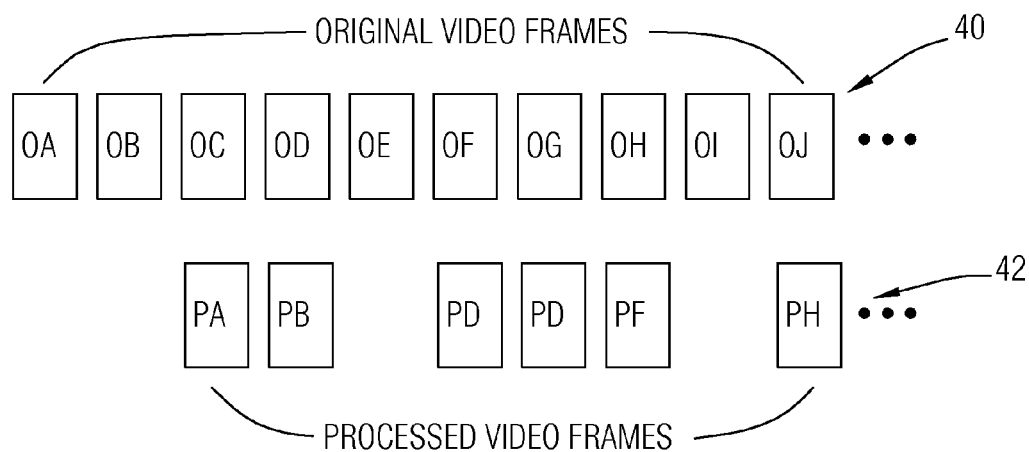
FIG. 2 schematically illustrates a set of original video frames and processed video frames.

Referring to FIG. 2, a set of original video frames 40 is shown along with a set of processed video frames 42. The original video frames 40 are indicated as frames OA-OJ. The illustrated processed video frames are indicated PA-PH. The video frames in FIG. 2 are shown in a sequential order from right to left over time. The frame OA corresponds to the frame PA in that the content of each of the frames OA and PA is the same. As can be appreciated from FIG. 2, there is a time lag between the original video frames and the processed video frames indicated by the frame PA being further to the left (according to the drawing) than the frame OA.

The processed video frames 42 in this example do not include a frame PC, which would have corresponded to the frame OC from the original video. In one example, the frame OC does not get transmitted to the device 26 for one reason or another. In another example, the frame OC is deleted during the processing of the video. Whatever the cause, there is no frame within the processed video frames 42 that corresponds to the original video frame OC.

In FIG. 2, two of the processed video frames 42 are indicated as PD. This indicates a frame that could be considered a frozen frame because the content of each frame is the same and the frame PD is effectively repeated within the processed video. In this example, the second or repeated version of the frame PD is in the position where a frame corresponding to the frame OE would have been within the processed video.

In FIG. 2 the original frame OG was not transmitted successfully or otherwise was deleted during processing. Therefore, there is no corresponding frame PG within the processed video frames 42.

The example of FIG. 2 assumes an equal frame rate for the original and processed video frames. In many circumstances, this is not possible. For example, an original video file may have a frame rate of thirty frames per second. A capturing or sampling rate for obtaining the processed video typically will have a slower rate such as fifteen frames per second. In such an example, every other frame of the original video content will not be captured during processing. Therefore, it is necessary to accommodate not only transmission or processing errors that unexpectedly delete or miss an original video frame but also to accommodate the differences in frame rates so that some correlation between the original and processed videos is available for providing a quality indication.

Figure 3:
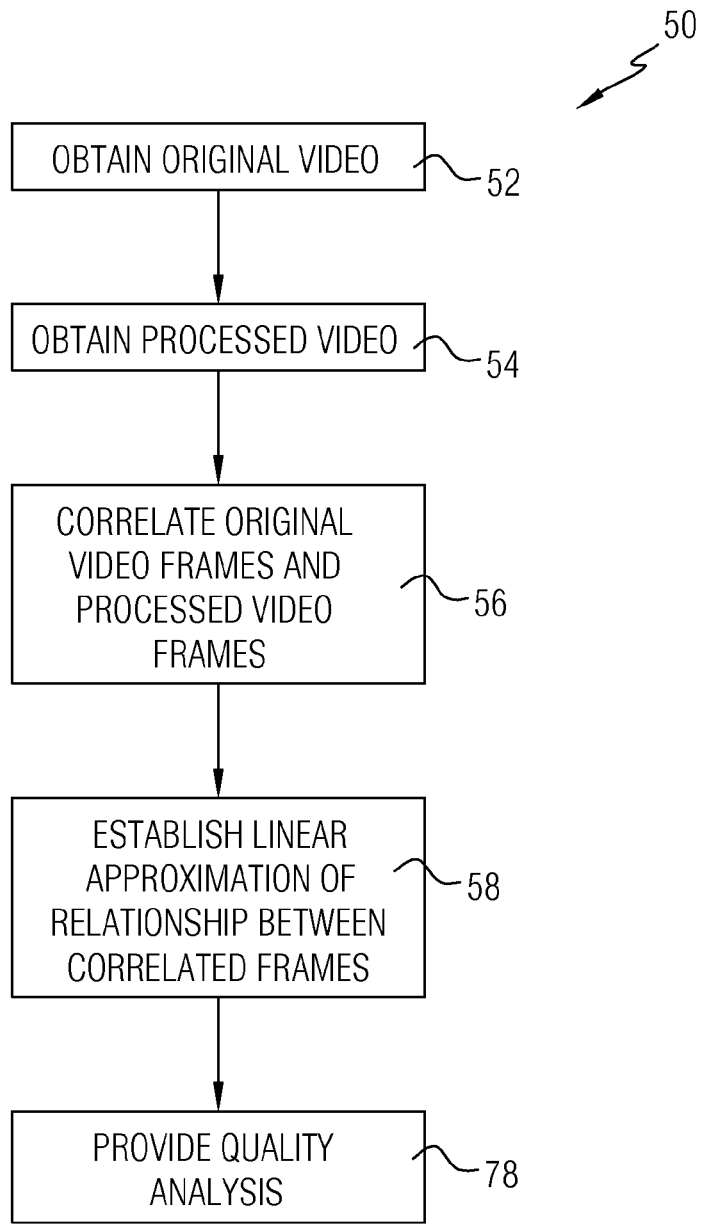
FIG. 3 is a flowchart diagram summarizing one example approach that is useful with an embodiment of this invention.

The flowchart 50 in FIG. 3 summarizes one example approach. At 52, the original video is obtained by the quality analysis device 30. The processed video is obtained at 54. The correlation portion 32 correlates the original video frames and the processed video frames at 56. The correlation process attempts to align the original video with the processed video within a desired resolution (e.g., within a one frame resolution) before any relative quality analysis can be performed. The correlation performed by the correlation portion 32 synchronizes the frames of the original video with the frames of the processed video to accommodate differences in frame rates (e.g., 30 frames per second of an original compared to five to fifteen frames per second of compressed content) and to account for any network impairment or processing device impairment that introduces jerkiness, stillness or frozen frames in the processed video. The latter aspects of a processed video may be difficult to detect for lower motion content video files.

One example includes embedding a known sequence number into every frame of the original video and using that for making a one-to-one correspondence between original video and the processed video frames. One example includes associating a watermark with each original video frame prior to processing. The same watermark information can then be extracted from the processed video and matching watermarks indicate corresponding frames that are correlated to each other.

In some examples, the processed video frames will be captured through a screen-capturing tool. It is not possible to automatically detect the frame rate of a processed video using such a tool. In order to have at least one snapshot of each frame, the screen capturing tool needs to capture every frame of the processed video at least once. The only way for this to occur is to have the processed video highly over-sampled by the capturing tool. Therefore, it is useful to remove redundant frames of the processed video that have been produced as a result of the capturing tool over-sampling approach. Removing redundant frames from the processed video allows for discarding extra snapshots of the same frame and keeps only one from each distinct received frame.

One example includes removing redundant frames of the original video to decimate the frame sequence of the original video to make it compatible with the processed frame sequence. Once the redundant frames are removed from each sequence (e.g., the pre-processed and processed videos), a one-to-one matching between the processed and original video sequences occurs in such an example.

In the case where a watermark is associated with each frame, the correlation process is based upon matching watermark sequences. One example includes using the last eight lines of every QCIF (144×176) frame for the watermark sequence. These lines are divided into 22 blocks of 8×8 pixels, each block representing a binary number. In one example, 8 bit pixels are used. Assigning all zeros to the pixels within a block represents a zero and assigning all ones to all 255 represents a one in one example. One example includes converting the decimal sequence number to a binary sequence number and then using that binary number for the bit-to-pixel mapping.

On a decoder side, integration and hard-detection for every watermark block allows for determining the frame sequence and correlating the frames of the processed video to the corresponding frames in the original video. One example includes a watermark extraction using the following relationship:

$$\text{Bit}(k) = \text{Round}\left(\frac{\sum_{i=1}^{8}\sum_{j=1}^{8}\text{sum}(\text{sum}(P(i, 8*(K-1)+j)))}{8 \times 8 \times 255}\right)$$

The frame number can then be calculated by converting the binary sequence to a decimal number representing the frame index.

In some situations, such as live camera transmission, it will not be possible to add watermarks to the frames of the original video. For such cases, a maximum likelihood full-frame correlation becomes necessary. One example includes using an edge-based correlation scheme for sequence alignment and frame correlation purposes. There are known edge extraction techniques and gradient methods that allow for comparing the content of original video frames with processed video frames. The edge pattern extracted from each processed video frame in one example is compared against the edge pattern extracted from all of the frames of the original video sequence. The original video frame that has the greatest edge image information correspondence (e.g., the minimum amount of difference) is correlated with a given processed video frame.

Once the correlation between the video frames of the original and processed videos is complete, a linear approximation of a relationship between the correlated frames is established at 58. The linear approximation portion 34 in one example includes suitable programming for establishing the linear approximation. A linear curve-fitting technique in one example is formulated as frame-index-original=compensation-rate*frame-index-processed+frame-offset. One example includes using this relationship for describing a line where the compensation rate corresponds to the slope (e.g., m from y=mx+b) of the line and the frame-offset corresponds to the offset used for defining a line (e.g., b from y=mx+b).

One example includes arranging the correlated frames in sequential order. Sets of correlated frames are then selected to determine a plurality of respective linear relationships. Each set, which includes less than all of the frames, will have its own compensation rate and frame offset. One example includes determining the compensation rate and frame offset that occurs most often among the plurality of respective linear relationships and using that compensation rate (e.g., slope) and frame-offset (e.g., offset) for establishing the overall linear approximation.

In one example, the correlated frames are grouped into sets of sequentially adjacent frame pairs. For example, the correlated original and processed frames OA and PA are placed into a set with the correlated original and processed frames OB and PB. The frame index (e.g., frame number and sequence) for each of those frames is then input into the curve-fitting relationship: frame-index-original=compensation-rate frame-index-processed+frame-offset and the compensation rate and frame offset for that set are determined. This process then continues for each set of sequentially adjacent frame pairs. For example, the next set of frame pairs would be OB, PB and OC, PC while the set following that would be OC, PC and OD, PD. Each set of sequentially adjacent frame pairs provides a value for the compensation-rate and the frame-offset.

One effect of this approach is that a linear approximation achieves fitting a line to the points describing the relationship between the correlated frames that results in a maximum possible number of points on the line (e.g., the maximum number of frames fitting within the linear approximation). The linear approximation is intended to approximate the relationship between the correlated frames that includes as many of the processed frames as possible on a single line that describes the relationship between the correlated frames.

Figure 4:
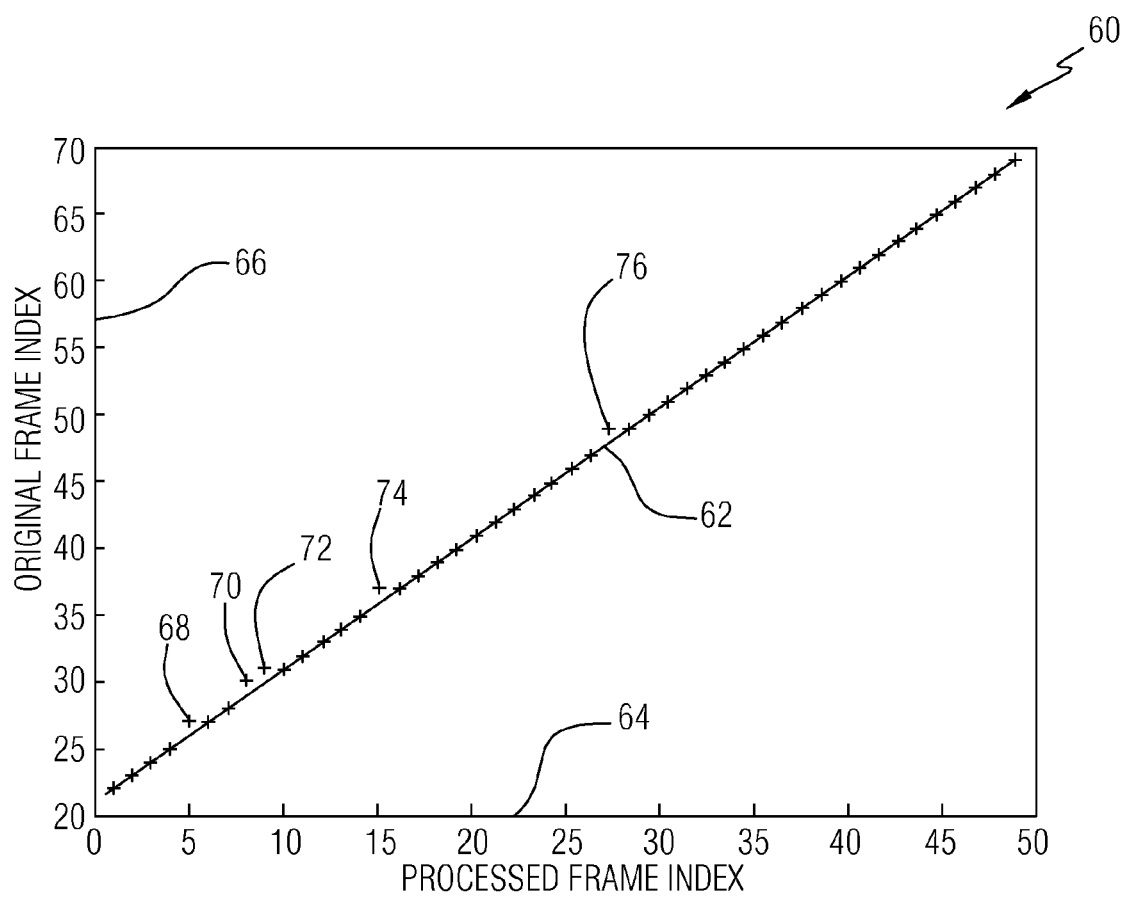
FIG. 4 graphically illustrates a linear approximation of a relationship between original and processed video frames.

The curve fitting technique of this example is different than a linear minuscule curve fitting algorithm. For example, the desired linear approximation technique attempts to fit as many processed video frames as possible into the linear approximation (e.g., as many points as possible on the line 62). A linear minuscule curve fitting algorithm, on the other hand, would tend to adjust the line in a manner that will not necessarily maximize the number of points on the line. In the example of FIG. 4, a traditional linear minuscule curve fitting algorithm would probably tend to adjust the line 62 slightly upward in the drawing brining the points 68-76 closer to the line but this would result in many (or all) of the points on the line in FIG. 4 being off the line.

FIG. 4 includes a graphical illustration of one example result of establishing a linear approximation for an example processed and original video. The graphical plot 60 in FIG. 4 includes a line 62 that is the result of the linear approximation in this example. The line 62 corresponds to the relationship between the correlated processed frames along the axis 64 and original frames along the axis 66. In this example, the line 62 has a slope of unity, which corresponds to no frame compensation, which might have occurred by the operation of a codec or other network unit in an example where the video is wirelessly transmitted between devices. This example includes a frame offset of 21 frames because the first processed video frame having a frame index value 1 corresponds to the original video frame having a frame index 22. In one example, the frame index corresponds to the sequential number of the frames in the video file.

As can be appreciated from FIG. 4, there are five instances shown at 68, 70, 72, 74 and 76 where there is a mismatch between the frame indexes such that the illustrated points 68, 76 are not on the line 62. Whenever a point is not on the line, that indicates that some error or lack of quality in that processed frame, which may have been caused by jerkiness, stillness, frozen frame or some other impairment of the processed frame. Determining whether a frame fits within the linear approximation (i.e., corresponds to a point on the line of the linear approximation) provides an indication of whether that processed video frame includes an error. Whether any frames do not fit within the linear approximation provides an indication of the quality of the processed video.

In FIG. 3, the quality analysis provided at 78 is based at least in part on whether any frames do not fit within the linear approximation. The quality analysis may be based only on whether any frames do not fit within the linear approximation, some characteristic of any frames not fitting within the linear approximation, the compensation rate, the frame offset or a combination of these.

The quality analysis in the illustrated example is based upon the linear approximation and the relationship of each processed frame to the linear approximation. For example, the number of points 68-76 that are not on the line 62 indicates a number of frames that have errors such as being a frozen frame or a highly distorted frame. The number of such frames may be a quality indication. Another quality indicator may be based on a percentage of frames that contain errors. One example includes providing a mean opinion score that is based upon any of the example factors mentioned above.

Another quality indication may be the distribution of frames whose reference does not fit the linear approximation. For example, a relatively high concentration of such frames in one segment of a video may be an indication of poor quality in some examples because at least a portion of the video will be significantly different than the original. In another example, the distribution of such frames across the entire video may indicate poor quality because of a repeated or continuous error that impairs an ability to use the processed video for an intended purpose. Of course, the opposite may be true for each situation (e.g., a relatively focused distribution or concentration of frames with errors may indicate good overall quality in some circumstances and a wide distribution of occasional frame errors may be acceptable for some circumstances).

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of analyzing a processed video, comprising
   correlating each frame of the processed video to a corresponding frame of a pre-processed version of the video;
   determining a linear approximation from a line with respect to a relationship between the correlated frames; and
   determining a quality of the processed video based upon whether any of the frames does not fit within the linear approximation.

2. The method of claim 1, comprising
   assigning a watermark to each frame of the pre-processed version of the video before it is processed;
   determining the watermark of each of the processed video frames; and
   using video frames of the processed video and the pre-processed video having the same watermark as the correlated frames.

3. The method of claim 1, comprising
   determining image edge information for each of the pre-processed video frames;
   determining processed image edge information of each of the processed video frames; and
   using video frames having corresponding image edge information as the correlated frames.

4. The method of claim 3, comprising
   determining a correspondence between
   (i) the processed image edge information of each one of the processed video frames and (ii) the image edge information of all of the pre-processed video frames; and correlating each processed video frame with the one of the pre-processed video frames having the greatest correspondence of image edge information.

5. The method of claim 1, comprising arranging the processed video frames in sequential order along one axis;

arranging the correlated pre-processed video frames in sequential order along another axis perpendicular to the one axis; and determining the linear approximation from a line relative to the axes that includes as many pairs of the correlated frames as possible.

6. The method of claim 5, comprising determining whether any frame is on the line as an indication of whether any processed video frame includes an error.

7. The method of claim 1, comprising selecting a plurality of groups of correlated frame pairs;

determining a respective linear relationship for each of the plurality of groups such that an index of the pre-processed frames in the group is equal to a frame offset plus an index of the processed frames in the group multiplied by a compensation rate.

8. The method of claim 7, comprising determining the linear approximation from a line having the one of the offsets and compensation rates from the respective determined linear relationships that occurs most often among the respective linear relationships.

9. The method of claim 8, comprising determining whether the frame index of any processed video frame is on the line as an indication of whether any processed video frame includes an error.

10. The method of claim 1, comprising determining a compensation rate of the processed video based upon a slope of the linear approximation.

11. The method of claim 10, wherein the linear approximation includes a line having a slope of unity.

12. The method of claim 1, comprising determining a frame index offset between the pre-processed and processed video frames; and determining a lag of the processed video relative to the pre-processed video from the determined offset.

13. The method of claim 1, comprising establishing the linear approximation to include as many of the frames as possible on a single line that describes the relationship between the correlated frames; and determining whether any frame is on the line as in indication of whether any processed video frame includes an error.

14. The method of claim 1, comprising determining a number of frames that do not fit within the linear approximation as an indicator of quality.

15. The method of claim 14, comprising determining a percentage of the frames that do not fit within the linear approximation as an indicator of quality.

16. The method of claim 1, comprising determining a distribution of any frames that do not fit within the linear approximation as an indicator of quality.

17. A device for analyzing a processed video, comprising a correlation portion configured to correlate each frame of the processed video to a corresponding frame of a pre-processed version of the video;

a linear approximation portion configured to determine a linear approximation from a line with respect to a relationship between the correlated frames; and a quality determining portion configured to determine a quality of the processed video based upon whether any of the frames does not fit within the linear approximation.

18. The device of claim 17, wherein the correlation portion is configured to correlate the frames based upon whether a watermark associated with a processed video frame corresponds to a watermark of any of the pre-processed video frames; or correlate the frames based upon how closely image edge information for each of the processed video frames corresponds to image edge information for the pre-processed video frames.

19. The device of claim 17, wherein the linear approximation portion is configured to determine a linear approximation that maximizes a number of the frames that fits within the linear approximation.

20. The device of claim 17, wherein the quality determining portion is configured to determine at least one of a number of frames that do not fit within the linear approximation, a percentage of frames that do not fit within the linear approximation, or a distribution of frames that do not fit within the linear approximation as an indicator of quality.

* * * * *